(12) United States Patent
Yaqub

(10) Patent No.: US 7,720,581 B2
(45) Date of Patent: May 18, 2010

(54) MONITORING OF VEHICLE CONDITIONS UTILIZING CELLULAR BROADCASTS

(75) Inventor: Raziq Yaqub, Stewartsville, NJ (US)

(73) Assignees: Toshiba America Research, Inc., Piscataway; Telcordia Technologies, Inc., Piscataway ( * ) Notice: Subject to any disclaimer, the term of this patent is extended or adjusted under 35 U.S.C. 154(b) by 774 days.

(21) Appl. No.: 11/456,824

(22) Filed: Jul. 11, 2006

(65) Prior Publication Data

US 2007/0093247 A1 Apr. 26, 2007

Related U.S. Application Data

(60) Provisional application No. 60/596,659, filed on Oct. 11, 2005.

(51) Int. Cl.
*G08G 1/0967* (2006.01)
*G06F 19/00* (2006.01)

(52) U.S. Cl. .................. 701/33; 701/117; 701/210; 455/456.3; 340/995.13

(58) Field of Classification Search .......... 701/117, 701/210, 1, 29, 33; 455/456.1, 456.3, 404.2, 455/414.3, 423, 426.2; 340/995.13, 995.12, 340/993
See application file for complete search history.

(56) References Cited

U.S. PATENT DOCUMENTS

| | | | |
|---|---|---|---|
| 5,257,023 A | 10/1993 | Furuya | |
| 5,485,161 A | 1/1996 | Vaughn | |
| 5,933,100 A | 8/1999 | Golding | |
| 6,047,234 A | 4/2000 | Cherveny | |
| 6,631,322 B1 * | 10/2003 | Arthur et al. ................. 701/211 |
| 6,756,913 B1 | 6/2004 | Ayed | |
| 6,810,321 B1 | 10/2004 | Cook | |
| 6,911,918 B2 * | 6/2005 | Chen ...................... 340/995.13 |
| 7,286,929 B2 * | 10/2007 | Staton et al. ................ 701/206 |
| 7,440,842 B1 * | 10/2008 | Vorona ........................ 701/117 |
| 2003/0225516 A1 * | 12/2003 | DeKock et al. ............. 701/214 |
| 2006/0247844 A1 * | 11/2006 | Wang et al. ................. 701/117 |
| 2007/0067086 A1 * | 3/2007 | Rothschild ................... 701/93 |
| 2007/0129055 A1 * | 6/2007 | Ehlers ..................... 455/404.2 |
| 2009/0118995 A1 * | 5/2009 | Zhao et al. .................. 701/117 |

OTHER PUBLICATIONS

International Search Report, dated October 31, 2007.
3GPP TS 23.041, 3rd Generation Partnership Project (3GPP); Technical Specification Group Terminals; Technical realization of Cell Broadcast Service (CBS), Oct. 1999, p. 1-32, 3GPPTM, France.
V. Gupta, Liaison to IETF MIPSHOP from 802.21, May 22, 2005, p. 1-2, IEEE 802.21 Media Independent Handover Services, USA.

* cited by examiner

*Primary Examiner*—Tan Q. Nguyen
(74) *Attorney, Agent, or Firm*—Watchstone P&D, PLLC

(57) ABSTRACT

This document describes, among other things, a systems and methods for monitoring vehicle conditions via cellular networks. In some embodiments, a system for monitoring vehicle conditions is provided that includes at least one network information repository server having at least one database containing information related to vehicle conditions. The at least one network information repository server is configured to receive updates from mobile stations that perform a comparison of vehicle conditions based on actual information sensed by the mobile stations as compared to expected vehicle conditions and that upon identifying an inconsistency send an update to the network information repository server. Moreover, the network information repository server is configured to transmit updated information to a cellular network for broadcasting or multicasting to mobile stations or to send information via a cellular interface or wirelessly to mobile stations.

20 Claims, 10 Drawing Sheets

Figure-1: NIR Interfaced with CBC of Cellular System

Figure 2: Algorithm Performed by MC in Active Mode

Figure 3: Algorithm Performed by MC in Active Mode

Figure 4: Algorithm Performed by MC in Passive Mode

MONITORING OF VEHICLE CONDITIONS UTILIZING CELLULAR BROADCASTS

The present application claims priority to U.S. provisional application Ser. No. 60/596,659, filed on Oct. 11, 2005, the entire disclosure of which is incorporated herein by reference as though recited herein in full. In addition, the entire disclosure of the present assignees' prior U.S. patent application Ser. No. 11/267,590, entitled Network Discovery Mechanisms, filed on Nov. 7, 2005, is also incorporated herein by reference for reference.

BACKGROUND

1. Field of the Invention

The present application relates to wireless communications and in particular to, inter alia, a methods and systems for vehicle management using cellular broadcasts, and, more particularly, in some embodiments, to road congestion management.

2. Background Discussion

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier. IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11× devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Network Discovery

Future Mobile Communication Systems will focus on integration of heterogeneous Radio Access Technologies. These technologies may comprise of e.g., PANs (Personal Area Networks with very small coverage), WLANs (Local Area Networks with comparatively large coverage area), and WANs (Wide Area Networks with comparatively larger coverage area e.g., cellular or WiMax). Since focus is on integration, the requirements are more stringent than those for simply interworking. One such requirement is global roaming across these heterogeneous Radio Access Technologies with ubiquitous and transparent service provisioning. Global Roaming necessitates efficient method for quick vertical handovers, which in turn demands (a) Identification of certain Network Elements ahead of time; and (b) Communication of Mobile Station (MS) with these Network Elements in advance.

Identification of Network Elements means determining the existence of APs (Access Points), Routers, DHCP Servers (Dynamic Host Configuration Protocol) and several Authentication Servers such as AAA, (Authentication, Authorization and Accounting), PANA Server (Protocols for carrying Access Network Authentication) and in some cases SIP Server (Session Initiation Protocols).

Communication with the Network Elements may comprise exchange of messages e.g., for fetching General Information about the Networks, Information about the Lower Layers and the available Information about Higher Layer Services for establishing proactive security association and getting IP address. Identification of Network Elements and communicating with them is referred to as Network Discovery.

Network Discovery has gained a lot of interest these days. Several techniques have been proposed, however they have some drawbacks. Among other things, known methods of "Networks Discovery" focus on two phase approach.

Phase-1: Establishing a NIR (Networks Information Repository), and filling it with the Networks Information by means of Reporting Agents (RAs). The RAs collect the information about Network Elements in a domain and send it to the NIR. (e.g., if a specific network element is attached/detached or becomes operational/non-operational its information is reported to the NIR). RAs are regular MSs that happen to be present in that domain at that time. NIR (i.e., Networks Information Repository) is also referred to in literature as Networks Information Database, or Media Independent Information Server.

Phase-2: Reuse of NIR information by new mobile entrants in that domain. i.e., any MS when it enters in a new domain can enquire to NIR about the Network Elements in that domain. The NIR was populated by the RAs previously present in that domain. The MS can access NIR from any single radio interface (such as, e.g., 802.11 access network, 3GPP or 3GPP2 networks) and can request information in advance about Network Elements of any domain.

There are a number of drawbacks in both the above noted phases. In Phase-1 (Populating NIR), each and every MS that happens to enter in a domain, unaware of the fact that the previously present or passing-by MSs have already updated the NIR, keeps on sending/replicating the same information about the domain it is passing through. This not only unnecessarily keeps the NIR busy in processing the replicated information but also generates signaling burdens on the network gratuitously.

In Phase-2 (Reuse of NIR Information), the prior methods assume that a MS is aware of NIR's reachable location. This method may not work well or may be inefficient if a MS is not aware of the NIR's reachable location.

The present invention provides a variety of advances and improvements over, among other things, the systems and methods in the background.

REFERENCES

Additionally, the present invention provides a variety of advances and improvements over, among other things, the systems and methods in the background art described in the following references, the entire disclosures of which references are incorporated herein by reference.
1. 3GPP TS 23.041, 3rd Generation Partnership Project (3GPP), Technical Specification Group Terminals, Technical realization of Cell Broadcast Service (CBS)(Releases 1 to 7)(http://www.3gpp.org/ftp/Specs/archive/23_series/23.0411).
2. 3GPP TS 31.102, 3rd Generation Partnership Project (3GPP), Technical Specification Group Core Network and Terminals, Characteristics of the Universal Subscriber Identity Module (USIM) Application (Releases 1 to 7) (http://www.3gpp.org/ftp/Specs/archive/31_series/31.1021).
3. IEEE 802.21 Media Independent Handover Services, http://www.ieee802.org/21/, I.E.E.E. 802.21 Doc No. 21-05-0240-01-000 (e.g., submitted May, 2005).

SUMMARY OF THE INVENTION

The present invention improves upon the above and/or other background technologies and/or problems therein.

According to some embodiments, a system for monitoring vehicle conditions is provided that includes: at least one network information repository server having at least one database containing information related to vehicle conditions; the at least one network information repository server being configured to receive updates from mobile stations that perform a comparison of vehicle conditions based on actual information sensed by the mobile stations as compared to expected vehicle conditions and that upon identifying an inconsistency send an update to the network information repository server; and the network information repository server being configured to transmit updated information to a cellular network for broadcasting or multicasting to mobile stations or to send information via a cellular interface or wirelessly to mobile stations.

In some examples, the network information repository server transmits information via a cellular interface or wirelessly to mobile stations. In some examples, the network information repository server transmits information to mobile stations using SMS or another messaging service. In some embodiments, the monitored vehicle conditions include road congestion, and the system is adapted to inform users, on a substantially real time basis, about sections on a road or highway facing congestion at a particular time. In some embodiments, the system is configured to inform users on a real time basis about sections on a road or highway that is facing congestion at a particular time via the network information repository server.

In some examples, the mobile station is configured to compare its own speed and a specified speed limit, and, if there is an inconsistency, the mobile station sends a message to the network information repository server to report the inconsistency. In some examples, the network information server depicts an intensity of traffic congestion for display within a vehicle using visual representations on the vehicle's navigation device, and, in some cases, the visual representations include color coding. In some environments, the vehicle conditions involve road congestion, vehicle speeding, accident detection, unsafe or reckless driving, or unsafe road conditions.

According to some other embodiments, a system for electronic dispatching of a vehicle for hire is disclosed that includes: a) a network information repository server adapted to receive a message from a user mobile station of a user's current location; b) the network information repository server being adapted to search a database for a qualifying vehicle for hire; and c) the network information repository server being adapted to, upon finding a qualifying vehicle for hire, send a message via a cellular network to the operator of the vehicle for hire. In some examples, qualifying vehicles for hire include at least one taxi cab. In other examples, the qualifying vehicles for hire include at least one taxi cab that: is registered in an established database maintained on the network information repository server; and is sufficiently in the proximity of the geographical coordinates of the user.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DISCUSSION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Illustrative Architecture

Figure 5:
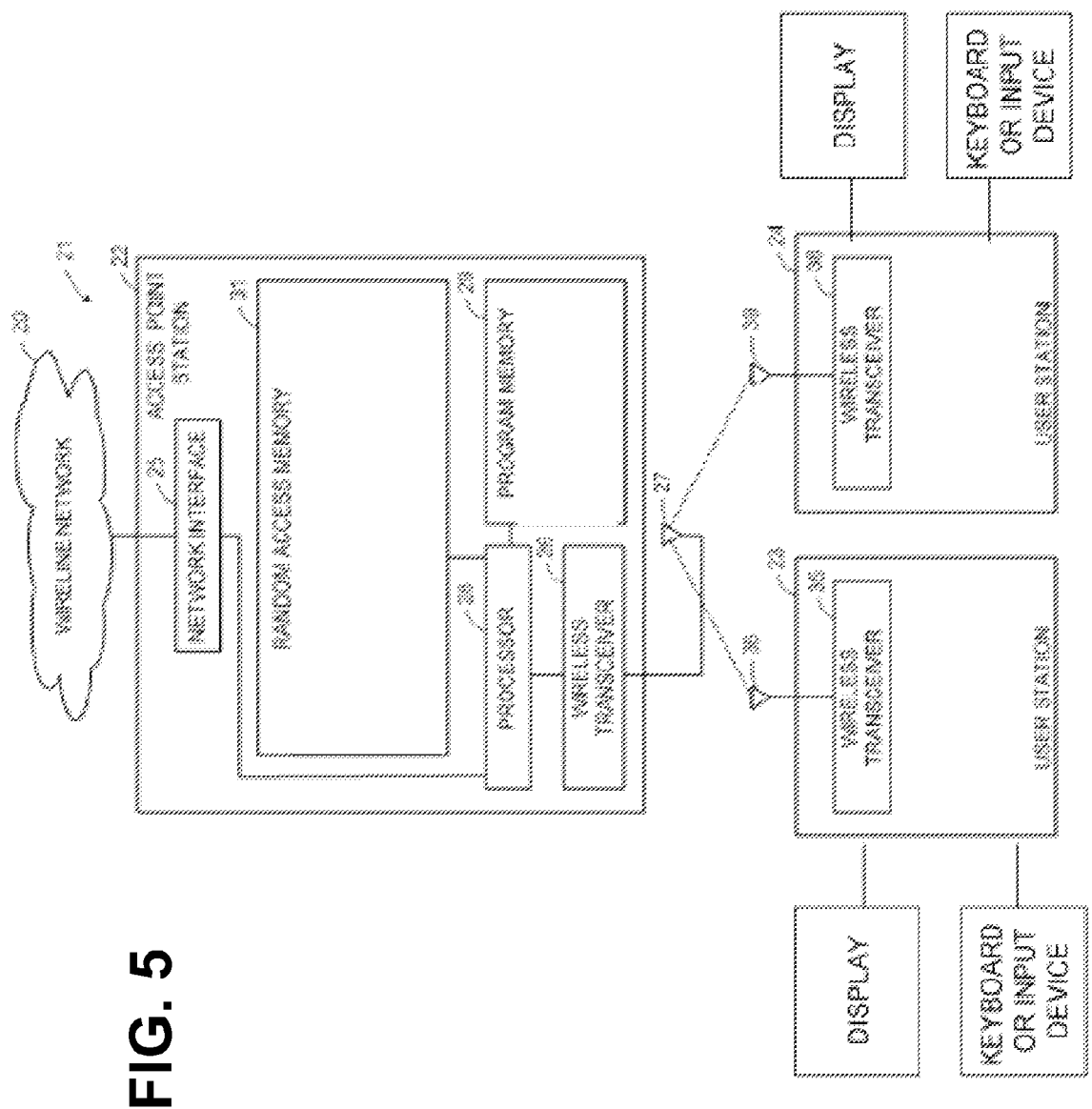
FIG. 5 is an illustrative architectural diagram showing illustrative components of some illustrative network elements.

In the preferred embodiments, devices, such as, e.g., radio network controllers, (RNCs), cell broadcast centers (CBCs), network interface repositories (NIRs), access points (APs), mobile stations (MSs), etc., are employed, each of which includes, e.g., computer components as known in the art. By way of example, each can include data processing capabilities and can include hardware and/or software components known in the art, including basic computer components, such as, e.g., processor(s), data storage, memory, and means for sending/receiving data, such as, e.g., transceivers and/or other appropriate components as would be understood by those in the art based on this disclosure. By way of illustration, FIG. 5 depicts some illustrative architectural components that can be employed in some illustrative and non-limiting implementations including wireless access points to which mobile devices communicate. In this regard, FIG. 5 shows an illustrative wireline network 20 connected to a wireless local area network (WLAN) generally designated 21. The WLAN 21 includes an access point (AP) 22 and a number of user stations 23, 24. For example, the wireline network 20 can include the Internet or a corporate data processing network. For example, the access point 22 can be a wireless router, and the user stations 23, 24 can be, e.g., portable computers, personal desk-top computers, PDAs, portable voice-over-IP telephones and/or other devices. The access point 22 has a network interface 25 linked to the wireline network 21, and a wireless transceiver in communication with the user stations 23, 24. For example, the wireless transceiver 26 can include an antenna 27 for radio or microwave frequency communication with the user stations 23, 25. The access point 22 also has a processor 28, a program memory 29, and a random access memory 31. The user station 23 has a wireless transceiver 35 including an antenna 36 for communication with the access point station 22. In a similar fashion, the user station 24 has a wireless transceiver 38 and an antenna 39 for communication to the access point 22. By way of example, in some embodiments an authenticator could be employed within such an access point (AP) and/or a supplicant or peer could be employed within a mobile node or user station.

Figure 6:
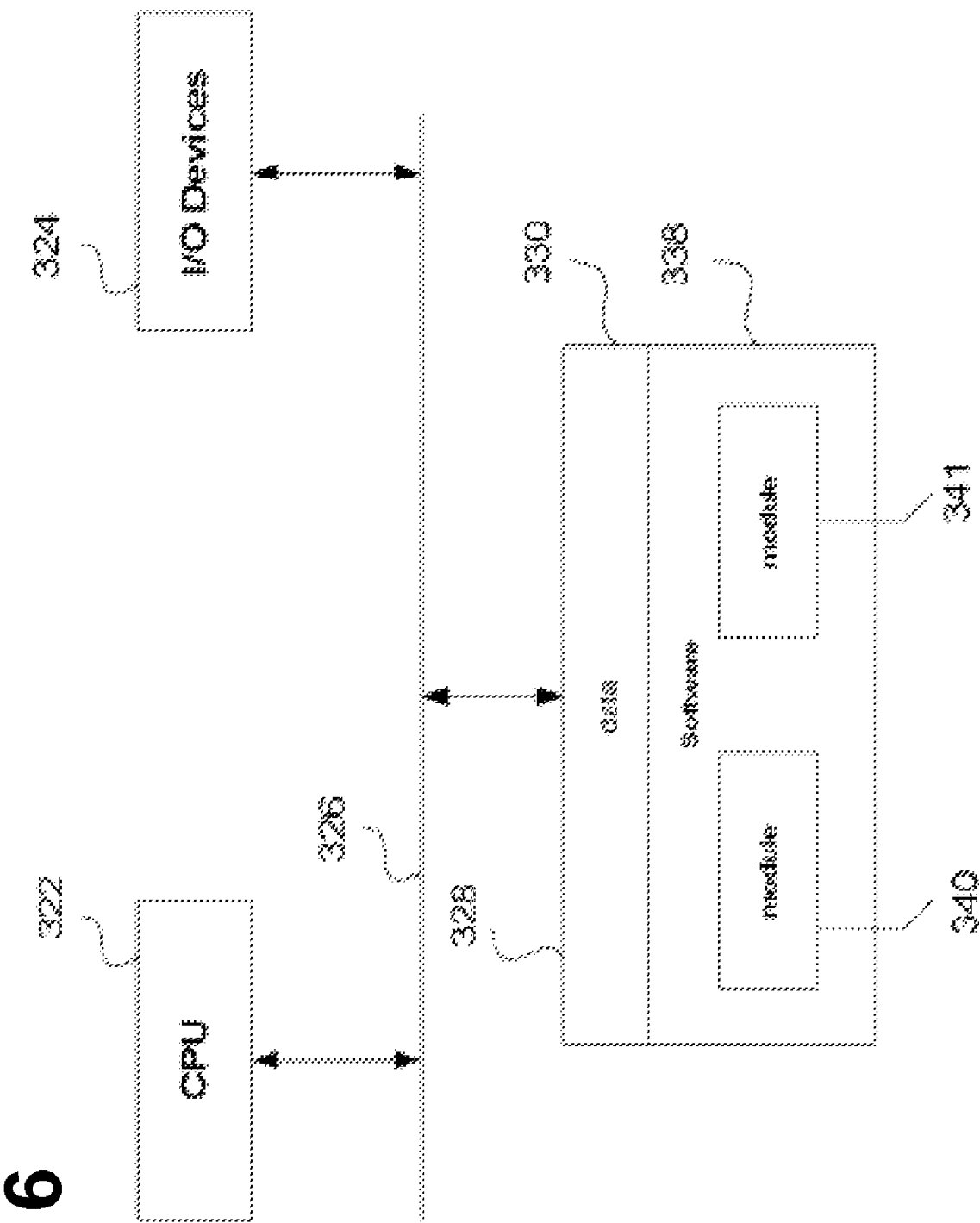
FIG. 6 is an illustrative architectural diagram depicting some illustrative device components in some illustrative embodiments.

FIG. 6 shows an illustrative computer or control unit that can be used to implement computerized process steps, to be carried out by devices, such as, e.g., an access point, a mobile station and/or other devices, in some embodiments of the invention. In some embodiments, the computer or control unit includes a central processing unit (CPU) 322, which can communicate with a set of input/output (I/O) device(s) 324 over a bus 326. The I/O devices 324 can include, for example, a keyboard, monitor, and/or other devices. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 for implementing the steps of processes. Conventional programming techniques may be used to implement these modules. Memory 328 can also store the above and/or other data file(s). In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

Discussion of the Preferred Embodiments

The preferred embodiments provide some illustrative new methods and systems that can, among other things, overcome the above-noted and/or other flaws.

Figure 1:
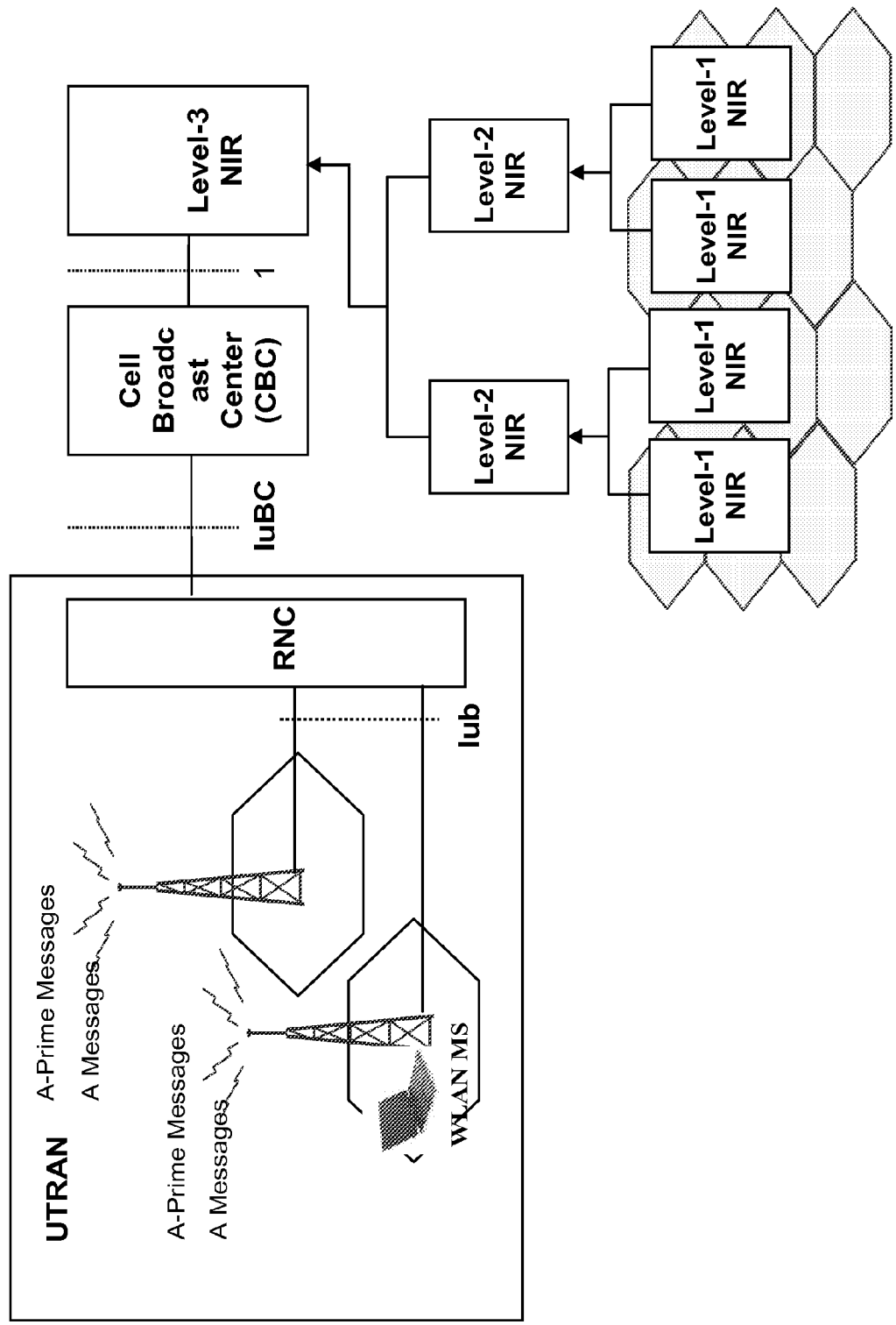
FIG. 1 is an architectural diagram showing illustrative network interface repositories (NIRs) interfaced with a cell broadcast centers (CBC) of a Cellular System according to some illustrative embodiments.

For reference, FIG. 1 depicts an illustrative architectural representation of some illustrative and non-limiting embodiments of the invention. As shown in FIG. 1, at least one network information repository (NIR) is provided that communicates, see numeral 1, with a Cell Broadcast Center (CBC). In the illustrated example, as discussed below, a plurality of NIRs are arranged in a hierarchical fashion. However, in other embodiments, a non-hierarchical structure can be employed, such as, e.g., with only a single NIR. As shown in FIG. 1, the CBC can be used to achieve cellular broadcasts via, e.g., a radio network controller (RNC) that cause broadcasts to be achieved via base stations or the like, such as, e.g., via one of the two illustrated base stations shown in the box UTRAN in FIG. 1. As also depicted, the base stations have a cell coverage area, illustrated schematically with six-sided cells in the figure, within which one or more of networks, such as, e.g., WLANs and MSs can be situated.

Figure 7:
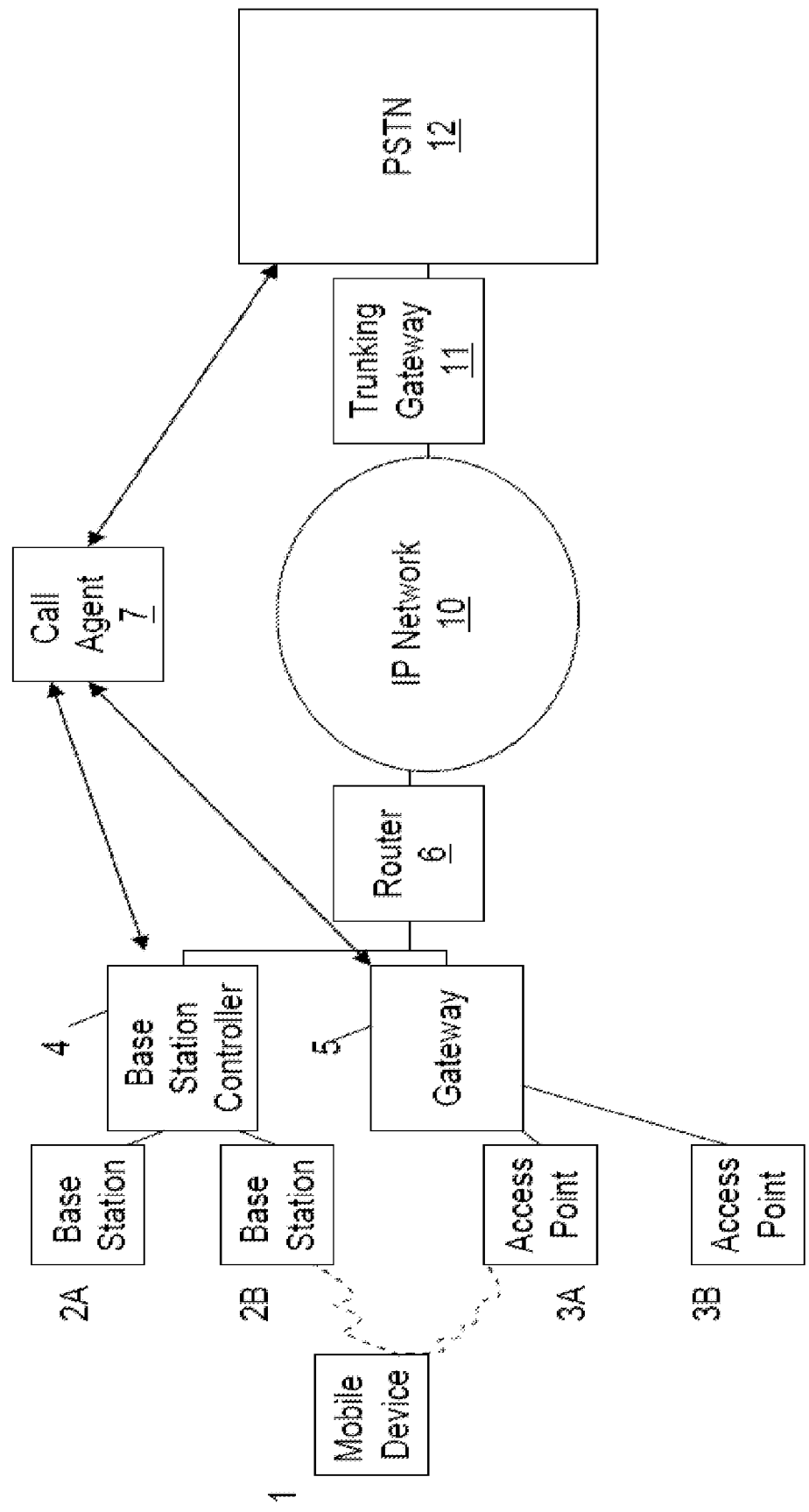
FIG. 7 is an illustrative architectural diagram depicting an illustrative environment in which a mobile device having a plurality of interfaces communicates with a plurality of networks.

For reference, FIG. 7 also shows an illustrative and non-limiting general architectural diagram of an illustrative environment within which components of the present invention can be employed, if desired. As depicted, the mobile stations, MSs, preferably have multiple interfaces, enabling communications with Access Points (APs) of WLANs or the like and Base Stations (BSs) of Cellular Networks or the like as shown. In particular, the illustrated example shows an illustrative network configuration in which a mobile device 1 is shown as having interfaces for communicating with base stations 2A, 2B and access points 3A, 3B. In this illustrative example, the base stations 2A and 2B are shown as communicating with a base station controller 4 that in turn communicates with a call agent 7 which is in communication with the public switched telephone network (PSTN) 12. As also shown, the access points 3A and 3B can include, e.g., IP network access points and can be in communication with a gateway 5 that communicates, in turn to a router 6 that communicates via an IP network 10, such as, e.g., the Internet, via a trunking gateway 11 to the public switched telephone network 12.

According to the preferred embodiments of the new approach, the NIR (which can include, e.g., a server computer) is made capable of performing the following functions:

1. The NIR will be capable of Receiving ONLY Updated Information about Network Elements of any domain through those MSs only who will first discover whether at least some Network Element(s) is/are attached or detached. Thus, each and every MS, that happens to enter in a domain, will not be compelled to send the same information over and over again. This will provide relief to the NIR from processing the replicas of information; and will also lower the signaling volume on the network.

2. The NIR will be capable of Storing Information about Network Elements Categorically Duly Mapped with Geographical Location Coordinates and Time. There will preferably be two categories of stored information; "Primary Information" and "Secondary Information." Primary Information may include, for example, SSIDs of available networks, addresses of the DHCP server, and address of authentication server, etc. Secondary Information can be, e.g., primarily comprised of network capabilities. In such cases, in various embodiments, the networking capabilities that each mobile device wishes to know can vary significantly depending on the capabilities and applications of the particular mobile device. Thus, Secondary Information can be considered as the additional information that can include, e.g., higher layer information and/or detailed information about lower layers. For example, Type of Security Protocols supported (e.g., Open Access Control, Universal Access Control, or 802.1× Access Control, etc.), Type of Internet Protocols supported (e.g., IPv4, IPv6, etc.), Support for QoS, Support for interworking with other networks, Existence of Roaming Relationship and Names of Roaming Partners, Pricing Information, and Services Supported by the networks. Notable bases for categorizing the information in Primary and Secondary is explained in the following paragraphs. However, both categories of information will help an MS to determine the candidate networks and to perform pre-authentication with the best one ahead of time.

3. The NIR will be capable of Communicating to the CBC (Cell Broadcast Center [2]) to convey Primary Information for Cell Broadcast. Thus, Primary Information can also be regarded as Push Type Information. Cell Broadcasting is an existing, but rarely used, function of cellular networks and is defined by the standardization bodies such as 3GPP and 3GPP2. Cell broadcasting allows messages to be broadcasted to all mobile handsets in a given geographical area. This area can range from the area covered by a single cell to the whole network. Because cell broadcast works by targeting particular cells, no knowledge of mobile telephone numbers is required. Also, cell broadcasting places a very low load on a cellular network; a cell broadcast to every subscriber on the network is essentially equivalent to sending an SMS message to a single phone. The cell broadcast technology provides for 64000 broadcast channels so that different types of message (such as, e.g., by way of example, messages related to traffic conditions, severe or other weather, terrorist activities or threats, public announcements, missing children, and/or various other types of messages) could be broadcast on different channels. Preferably, not every subscriber would necessarily receive all the channels and, hence, all of the messages. In some embodiments, channels can be activated from the handset or can be activated remotely by the network. In some embodiments, certain channels are allocated for certain message types (preferably, standardized on a wide geographic area, such as, e.g., regionally or globally) so that travelers can receive, e.g., alerts substantially wherever or wherever they happen to be. Preferably, the essential or Primary Information about the Network Elements will be broadcasted on such channels. Thus, the Primary Information can also be referred as Push Type Information. (Note: Depending on the business case or the particular circumstances, this information can be alternatively multicast to the subscribed users instead of using broadcasting).

4. The NIR will be capable of Defining a Geographical Area to CBC where the information is to be broadcasted to—. e.g., the NIR is preferably capable of explaining to the CBC to transmit the Network Information pertaining to, for example, Area-A from the Base Station that is located in Area A and Network Information pertaining to, for example, Area B, from the Base Station that is located in Area B, and so on.

5. The NIR will be capable of Communicating with (in some embodiments) Numerous CBCs belonging to different network operators.

6. The NIR will also be capable of delivering Secondary Information Directly to the MSs that send direct inquiries to NIR. Thus, in some embodiments, the MSs can become equipped with Primary Information (through Cell broadcast) and Secondary Information (through direct inquiry) about neighboring networks and their parameters ahead of time. In this manner, the MSs can, among other things, be in a better position of implementing advanced capabilities for enhanced mobility support and/or other time sensitive mobile applications.

According to the preferred embodiments of the present invention, the Mobile Stations (MSs) are configured to perform the following functions:

1. The MSs are configured to listen to the Broadcasts to get Primary Information about Network Elements.

2. The MSs are configured to obtain Secondary or Additional Information about Network Elements by sending a direct query to NIR. Both the Primary and Secondary Information received through Broadcasts and through query to NIR, respectively, will help the MS to determine the candidate networks and to perform pre-authentication with the best one ahead of time. Secondary Information about the Network Elements will be extracted or pulled from the NIR based on inquiry. Therefore, it can also be referred as Pull Type Information.

In addition to above tasks, the MSs are also preferably configured to perform the following tasks:

3. MSs are configured to Listen and Compare the Broadcasts received from Cellular Networks (e.g., 3GPP, 3GPP2, etc) and Beckons from Non-Cellular networks (e.g., WLANs, WiMax, PANs, etc.) and to Comprehend the Inconsistencies between the messages received from two different interfaces. These Inconsistencies are referred as Primary Inconsistencies and may result, for example, if some specific Network Element is attached/detached or becomes operational/non-operational, but yet the CBC is not yet aware of these updates and still broadcasts the old Primary Information.

4. MSs are configured to Pull the information from the NIR and to Compare the Pulled/Secondary Information with that which that it obtains after actually connecting to a candidate network and Comprehending the Inconsistencies between the messages received from two different sources (i.e., the NIR and the Actual Network). These inconsistencies are referred as Secondary Inconsistencies and may result, for example, if some specific Network Element is attached/detached or becomes operational/non-operational in an actual network, but the NIR is unaware of these updates and still responds to the inquiries with the old Secondary Information.

5. MSs are configured to Notify both the Primary Inconsistencies (see above at step-3) and the Secondary Inconsistencies (see above at step-4) to the NIR (e.g., if the MS determines that information received through a Broadcast is inconsistent to that which it received through the Beckons, or, the information pulled from the NIR is inconsistent to that which it received from the network as part of its normal process for connecting to the visited network, the MS immediately, through any available interface, will inform NIR). Consequently, the NIR will update its Secondary and Primary Information database (e.g., either add or delete the entry from its database as the case may be) and, in turn, will convey the Primary Updates to the CBC. In this manner, even though this particular MS will have learned of the discrepancies by actually connecting to the Network, that MS's sharing of the Information with the NIR will enable other users to obtain the most correct Primary and Secondary Information in the event that they happen to visit the same network and inquire to NIR about it.

In some embodiments, the MSs can perform these tasks in Active or Passive Modes. In Active mode, both Primary Inconsistencies and Secondary Inconsistencies can be conveyed to the NIR, as depicted, e.g., in FIG. 2. However, in Passive Mode, only Primary Inconsistencies can be sent, such as shown, e.g., in FIG. 4. Preferably, the Secondary Inconsistencies, however, will be sent by some other MS if they are operating in Active Mode in that domain. This will also reduce the signaling traffic on the network and replicated data processing pressure on the NIR. Note that these tasks are in addition to the actual Active Mode tasks and can be performed either in parallel, or during the silent periods (i.e., during periods when there is no or essentially no transmission is occurring). As to the preferred embodiments, the actual Active Mode Tasks carried by an MS are listed below.

1. To perform a proactive secured handoff, the MS sends PANA authentication message to the PANA server.

2. The MS renews the IP address with the DHCP server of the candidate network.

3. The MS sends a binding update to the correspondent host (CH) or to the home agent.

According to the preferred embodiments, the NIR will be connected to the CBC. The information relating to Primary Category will be sent to the CBC for Cell Broadcast. As discussed above, a Cell Broadcast Area is defined in some embodiments as related to geographical areas where NIR messages are broadcasted. Its size may vary considerably. It is much smaller in dense urban areas (e.g., few hundred yards), and may be quite larger in less dense urban areas (around 3 miles). A larger Cell Broadcast Area may encompass hundreds of WLANs in its footprint. Broadcasting all the information (Primary as well as Secondary) about all the WLANs (existing in Cell Broadcast foot print) may not be feasible from CBC's capacity point of view. Thus, broadcasting only the Primary information makes a prolific sense to use the CBC capacity efficiently.

The message format; and the interface/protocols between NIR and CBC (indicated by "1" in FIG. 1 of this document) can be defined, however we recommend to reuse the protocols established in [2] for Interface between CBC and Radio Network Controller (RNC) (indicated by "2" in FIG. 1 of [2]). The reuse (with some refinements, if needed) will not only avoid reinvention of the wheel, but will also alleviate CBC from unnecessary translation of one type of protocols into other. For reference, a RNC typically manages connections to a plurality of base stations. For example, from the RNC, packet traffic and call traffic can typically be split off—e.g., with call traffic is sent on to a mobile switching center while data traffic is diverted to make their way to the Internet or a private IP network.

In another embodiment of the present invention, the NIRs can be connected to each other in a hierarchical manner and the highest level NIR can be connected to a CBC as shown in FIG. 1. For the sake of simplicity, only two hierarchal levels are shown, however depending on circumstances these could be more that meet the implementation requirements. In this illustrative example, Level-1 NIRs will send information to Level-2 NIRs, and Level-2 NIRs will send information to the Level-3 NIR, and the Level-3 NIR will send information to the CBC. In the preferred embodiments, the CBC will process the information based on location coordinates and will forward the information to a specific Base Station to broadcast it in a specific cell area.

In another embodiment of the present invention, the Primary Information, broadcasted through the cell broadcast, is structured or organized in two ways—i.e., "$P_{SF}$ Format" or "$P_{SE}$ Format". Both Formats essentially carry the same Primary Information for the MSs. However, one Format may be differentiated from the other by inserting an additional bit or header to give the MSs the following hints:

1. In preferred embodiments, a $P_{SF}$ Format informs the MSs that the Secondary Information associated with that Primary Information is available in an NIR (i.e., that the NIR is Filled with Secondary Information) and that the MSs may contact the NIR to pull that information.

2. In preferred embodiments, a $P_{SE}$ Format informs the MSs that (a) the Secondary Information associated with the Primary Information is not available in an NIR (i.e., that the NIR is Empty) and, hence, that it is pointless to contact the NIR to pull the Secondary Information and that (b) the NIR needs the Secondary Information to be Filled in and if any MS finds any information, it should forward it to the NIR too.

Preferably, once the information is updated, its format category is promoted from $P_{SE}$ to $P_{SF}$ Format. Among other things, this technique helps to provide efficient Query Response communications between an NIR and MSs, because 1) a MS will send a query to a NIR only if the MS receives a hint in the Cellular Broadcast that the NIR contains the desired information, and 2) a MS will also only report the information about any new Networks Elements if the NIR needs it.

In some advantageous embodiments, communication between an NIR and MSs (e.g., either direct or indirect through broadcast) using different formats or codes can trigger MSs to perform any specific task for the NIR—thus, it can create a variety of other applications. A couple of illustrative applications are explained below under the section captioned "Illustrative Applications."

In another embodiment of the present invention, cellular network assisted/associated location detection mechanisms can be implied. This can relinquish MSs to have their own mechanism of detecting their geographical location. Thus, a MS client may no longer be required to be GPS equipped in some circumstances.

Figure 3:
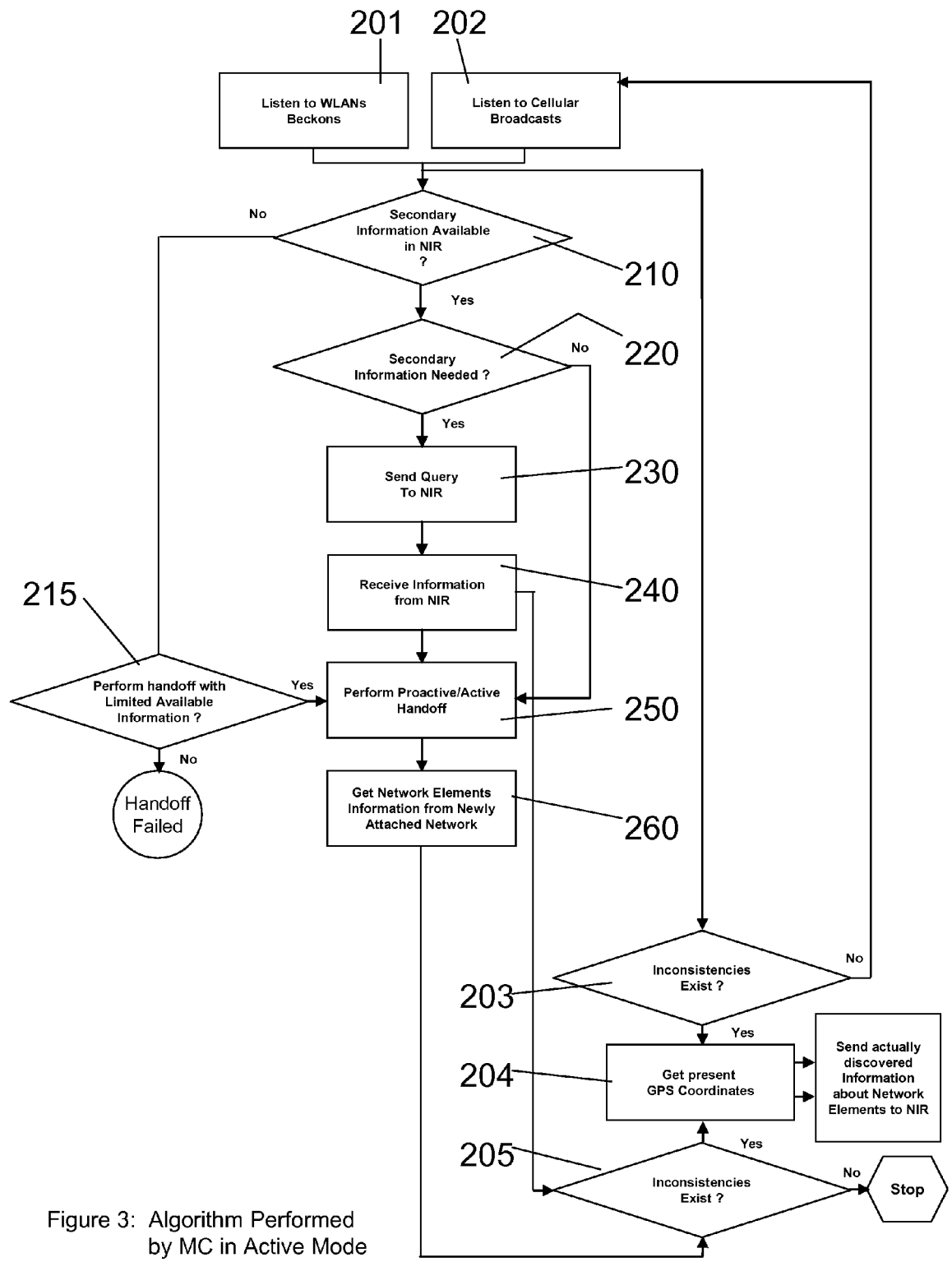
FIG. 3 is an illustrative flow diagram showing illustrative process steps performed by an MC in an active mode.

In yet another embodiment of the present invention, a MS may have a decision power to decide whether the Primary Information is enough for the MS's session continuity or whether it needs Secondary Information. In some applications/scenarios, an MS would not need Secondary Information and, thus, in such cases, there would be no need of sending queries to NIR each time. An illustrative flow diagram for this embodiment is depicted in FIG. 3.

Embodiments of the present invention, can not only surmount the flaws present in the existing techniques, but can also provide a number of other advantages, such as, e.g.:

(a) In some preferred embodiments, the MSs will always receive reliable information about the NIR's reachable location through cellular broadcasts. Notably, the prior known systems were inefficient because, among other things, such assumed that a MS was aware of a NIR's reachable location, which may not always be the case.

(b) In some preferred embodiments, a superfluous signaling traffic on the network and replicated data processing pressures on an NIR will be reduced. In preferred embodiments, every MS that happen to enter in a domain will first compare and detect the inconsistencies in the information received through different sources and will report those inconsistencies to the NIR. Once the NIR updates the CBC, and the CBC starts broadcasting the updating information, inconsistencies will virtually never exist and there will be virtually nothing for the other MSs to report anymore. This not only eliminates redundant signaling traffic, but, at the same time, relieves the NIR from unnecessary processing of replicated information. In contrast to this, in prior techniques all Reporting Agents whenever and wherever they would find any network, they would just keep on sending the information to the Networks Data Server, which would increases signaling traffic on the network and processing burdens on the NIR.

(c) In some preferred embodiments, the broadcasting of hints for the mobiles (e.g., $P_{SF}$ and $P_{SE}$ Formats as noted above) will also refrain a MS from contacting a NIR if the NIR does not contain desired information. This will not only provide efficient Query Response communication between a NIR and a MS, but will also inform the MS that the NIR needs Secondary Information and will inform the MS that if finds any information it should forward the information to the NIR too.

(d) In some preferred embodiments, the broadcasting of only the Primary Information, will use the CBC capacity efficiently. Moreover, since the footprint of a CBC broadcast area is large, a MS will typically receive essential information exceedingly ahead of time and will be better-off to support advance mobility and other time sensitive mobile applications.

(e) In some preferred embodiments, regardless of where a MS is and which local network it is connected to, the MS will always use a single protocol to communicate with the NIR to retrieve the desired information.

To facilitate reference, a further discussion of the illustrative and non-limiting embodiments depicted in the figures is now provided. Further discussion of the figures is now provided. With reference to FIG. 2, as discussed above, FIG. 2 shows an illustrative algorithm or process flow that can be performed in some illustrative embodiments by an MC or MS in an active mode. In this illustrative embodiment, at step 120 the mobile listens to cellular broadcasts, and, at step 121, the mobile listens to WLAN beckons. At step 127, the mobile compares these and evaluates if there are any inconsistencies. If the answer is no, the process goes back to step 120. If the answer is yes, then the process goes onward to step 128 and obtains the present GPS coordinates and sends actually discovered information about network elements to the NIR. In the meantime, after step 122, the mobile discerns if there is enough information for performing a proactive handoff. If the answer is yes, the process goes to step 125 and performs the proactive/active handoff. On the other hand, if the answer is no, the process goes to step 123 and sends a query to the NIR. Responsive thereto, at step 124, the mobile receives information from the NIR. Then, the process goes to step 125 and performs the proactive/active handoff. At step 126, the mobile obtains network elements information from the newly attached network. Then, at step 129, the process compares the information acquired at step 126 with that received at step 124 and determines if any inconsistencies exist. If the answer is no, this further process goes to stop. On the other hand, if the answer is yes, the process goes onward to step 128 and obtains the present GPS coordinates and sends actually discovered information about network elements to the NIR.

Referring now to FIG. 3, FIG. 3 shows another embodiment of an illustrative algorithm or process flow that can be performed in some illustrative embodiments by an MC or MS in an active mode. In particular, as shown, at step 201, the mobile listens to WLAN beckons, and, at step 202, the mobile listens to cellular broadcasts. At step 210, the mobile discerns if secondary information is available in the NIR. If the answer is no, the process goes to step 215 at which the mobile discerns whether it should perform the handoff with limited available information. At that point, if the answer is then no, the handoff fails. On the other hand, if the answer is yes, then the process goes to step 250. However, if the answer in step 210 is yes, the process goes to step 220 and discerns if secondary information is needed. If the answer is no, the process goes to step 250. However, if the answer is yes, the process goes to step 230 and sends a query to the NIR. Then, the mobile receives the information from the NIR at step 240. At step 250, which can be reached via any appropriate path noted above, the mobile performs a proactive/active handoff. At step 260, the mobile gets network elements information from the newly attached network. As shown at step 205, in some embodiments, the information acquired by the mobile at step 260 and the information received from the NIR at step 240 are compared by the mobile to discern if there are inconsistencies. If the answer is no, this further process goes to stop. On the other hand, if the answer is yes, at step 204, the mobile receives present GBS coordinates and sends actually discovered information about the Network Elements to the NIR. As shown at step 203, in some embodiments, the information received from steps 201 and 202 (i.e., from the beckons and the broadcasts) are compared for inconsistencies. If the answer is no, then the system continues back to step 202. On the other hand, if the answer is yes, then the system continues to step 204.

Figure 4:
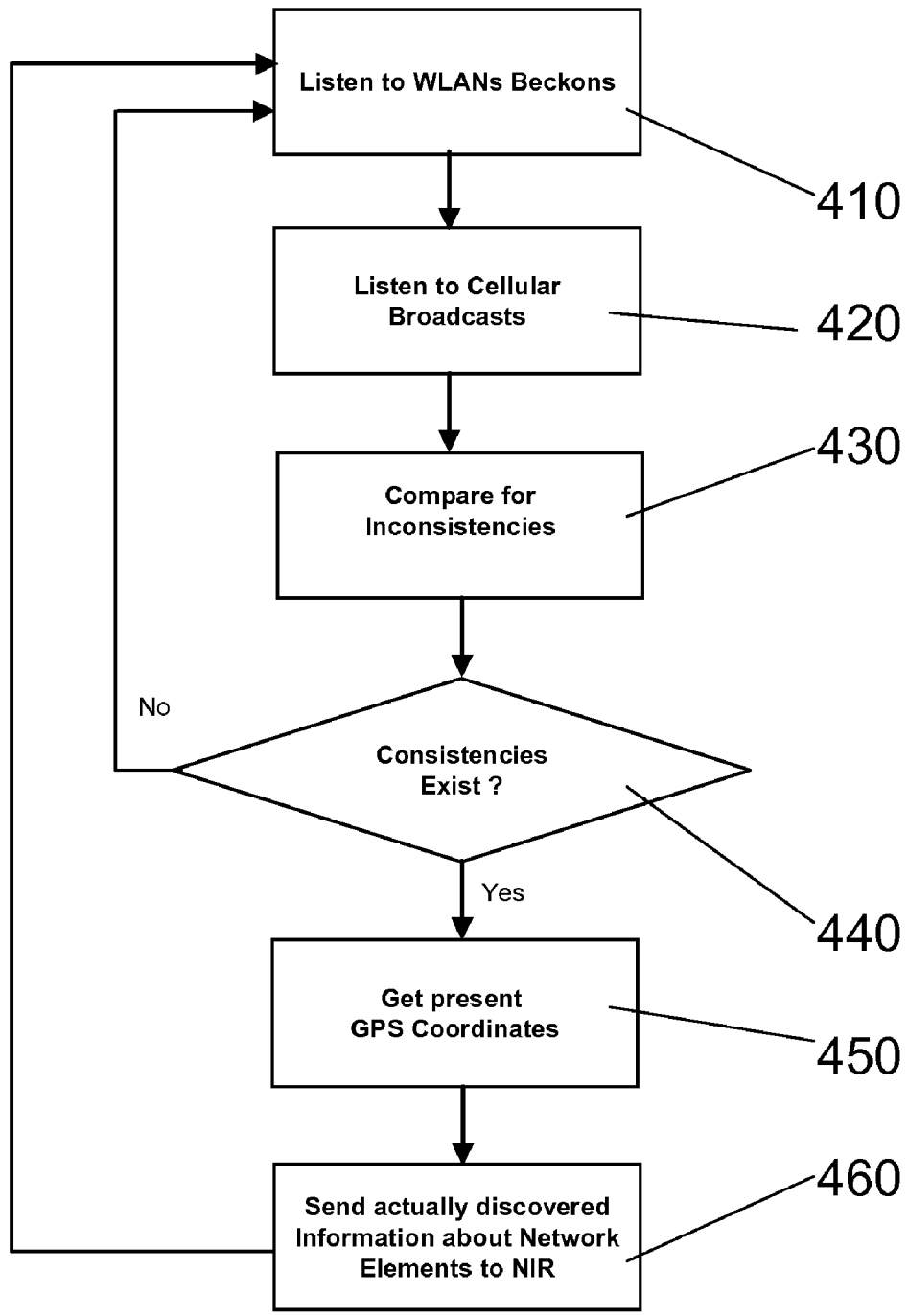
FIG. 4 is an illustrative flow diagram showing illustrative process steps performed by an MC in a passive mode.

Referring now to FIG. 4, FIG. 4 shows an embodiment of an illustrative algorithm or process flow that can be performed in some illustrative embodiments by an MC or MS in a passive mode. Here, at step 410 the mobile listens to WLAN beckons, and, at step 420, listens to cellular broadcasts. At steps 430-440, the mobile compares the WLAN beckons and the cellular broadcasts for inconsistencies and discerns if any inconsistencies exist. If the answer reached in step 440 is no, then the process returns to step 410. On the other hand, if the answer reached in step 440 is yes, then the process goes on to step 450 and the mobile obtains the present GPS coordinates. Thereafter, the process goes to step 460 and the system sends actually discovered information about network elements to NIR. Thereafter, the process returns to step 410.

Illustrative Architectures

According to some illustrative embodiments, NIRs, CBCs and MSs utilized to perform aspects of the preferred embodiments will be configured so as to achieve the following functions. It should be understood based on this disclosure that the functions performed by the components (e.g., NIRs, CBCs and MSs) can be varied based on circumstances.

NIR Functions:

In some illustrative embodiments, an NIR will be configured so as to perform some or all, preferably all, of the following functions.

1. In some embodiments, the NIR is configured such that the NIR receives updates from MSs or requests MSs to send updates to replace any expired piece of information in its database.

2. In some embodiments, the NIR is configured such that the NIR sends these updates to the CBC.

3. In some embodiments, the NIR is configured such that apart from the information to be broadcasted, the NIR also sends some Administrative Information meant for CBC use or higher level NIR use only. For example, the NIR can outline the geographical scope of the messages to be broadcasted (e.g., mapping the Networks Information with the Geographical Areas or with the list of Cell IDs for which broadcasts are meant).

4. In some embodiments, the NIR is configured such that each NIR sends its own identity (such as, e.g., its IP Address) to the higher level NIR or to the CBC.

5. In some embodiments, the NIR is configured such that each NIR appends some reference number to the messages. In some examples, this may be a Serial Number or a Version Number, or both. For instances, a Serial Number may be used if both Geographical Coordinates and Information both are new/changed, and a Version Number may be used if only the information contents are changed and Geographical Coordinates are unchanged.

Additional NIR Functions:

In some other illustrative embodiments, an NIR will be configured so as to perform some or all, preferably all, of the following functions. In particular, in order to make the NIR smarter, following additional capabilities can be built in NIR.

1. In some embodiments, the NIR is configured such that the NIR is capable for all aspects of formatting the messages to be delivered to CBC. For example, the NIR could use any well-known format, such as, e.g., RDF (Resource Description Framework) discussed, e.g., in reference [3] above.

2. In some embodiments, the NIR is configured such that the NIR is also capable of classifying the messages into two classes: (a) intended for user (e.g., service provider name, tariff, etc.) and (b) not essentially intended for the users (e.g., address of NIR or other servers). Thus, the MSs can selectively pick and display only those messages required by the MS user.

3. In some embodiments, the NIR is configured such as to communicate the preferred time and preferred frequency at which message broadcast is desired. By way of example, this may involve a calculation taking into consideration several factors, such as, e.g., the amount of information to be broadcasted, the speed of mobiles with which they move in the cells, etc.

4. In some embodiments, the NIR is configured such as to categorize the messages from a priority point of view—such as, e.g., a High Priority message can be requested to be broadcasted at the earliest opportunity and Normal Messages can be requested to be broadcasted according to, e.g., an associated repetition period. In some embodiments, the NIR can also instruct the CBC to cease message broadcasting, if needed.

5. In some embodiments, the NIR is configured such as to Use coding or different formats that can trigger MSs to perform certain desired actions for the NIR.

CBC Functions:

The CBC is a part of the cellular network and it may be connected to several BSCs/RNCs. It is responsible for the management of broadcast messages referred to as CBS messages. In some illustrative embodiments, a CBC performs some or all, preferably all, of the following functions.

1. In some embodiments, the CBS is configured such as to allocate serial numbers to its messages.

2. In some embodiments, the CBS is configured such as to determine the cells to which a CBS message should be broadcasted.

3. In some embodiments, the CBS is configured such as to determine a time at which a CBS message should be broadcasted.

4. In some embodiments, the CBS is configured such as to determine a frequency at which CBS message broadcast should be repeated.

5. In some embodiments, the CBS is configured such as to be capable of instructing each BSC and/or RNC to cease broadcast of the CBS message, if needed.

6. In some embodiments, the CBS is configured such as to be capable of initiating broadcast by sending fixed length messages to a BSC and/or RNC and where necessary padding the pages to a length of, e.g., 82 octets. Here, a length of 82 octets, using the default character set, equates to 93 characters. Up to 15 of these pages may be concatenated. In some embodiments, in order to enhance the message capacity, other Data Coding Schemes may also be used, such as, e.g., as schemes described in 3GPP Technical Specification TS 23.038, the contents of which are incorporated herein by reference.

7. In some embodiments, the CBS is configured such as to be capable of modifying or deleting CBS messages held by the BSC and/or RNC.

8. In some embodiments, the CBS is configured such as to be capable of determining the cell broadcast channel on which the message should be broadcasted.

9. In some embodiments, the CBS is configured such as to be capable of using Compression and/or Decompression that may take place between a NIR and an MS.

10. In some embodiments, the CBS is configured such as to be capable of assigning a message class to permit mobiles to selectively display only those messages required by the MS user. In some embodiments, the message class reveals the category of information and the language in which the message has been compiled. Through the use of appropriate Man-Machine-Interface, the user is then able to ignore message types that he does not wish to receive—such as, e.g., advertising information and/or messages in an unfamiliar language.

MS Functions:

In some illustrative embodiments, a MS will be configured so as to perform some or all, preferably all, of the following functions.

1. In some embodiments, the MS is configured such that it is equipped with multiple interfaces, such as, e.g., dual interfaces including WLAN and Cellular interfaces. In preferred embodiments, the MS listens to the cellular broadcasts and attempts to receive the CBC messages whose Message IDs are in a "search list". This "search list" preferably contains the Message IDs stored in, e.g., the $EF_{CBMI}$, $EF_{CBMID}$ and $EF_{CBMIR}$ files on the USIM [see Reference [2] incorporated herein by reference above] and any Message Identifiers stored in the User Equipment (UE) in a "list of CBC messages to be received". For reference, UE relates to, e.g., a cellular phone and all peripherals such as, e.g., USIM related to the MS. If the User Equipment (UE) has restricted capabilities with respect to the number of Message IDs it can search for, the IDs stored in the USIM shall take priority over any stored in the UE. In preferred embodiments, it learns about the available networks and the addresses of the associated network elements (such as, e.g., a DHCP Server, an Authentication server, etc.) operating in the cell of a cellular network footprint. These networks can be a part of same domain or different domains. In addition, the MS also learns about the IP address of the NIR.

2. In some embodiments, the MS is configured such that in case of concatenated pages, each of message will have the same message identifier (e.g., indicating the source of the message), and the same serial number. Using this information, the MS/UE is able to identify and ignore re-broadcasts of already received messages.

Figure 8:
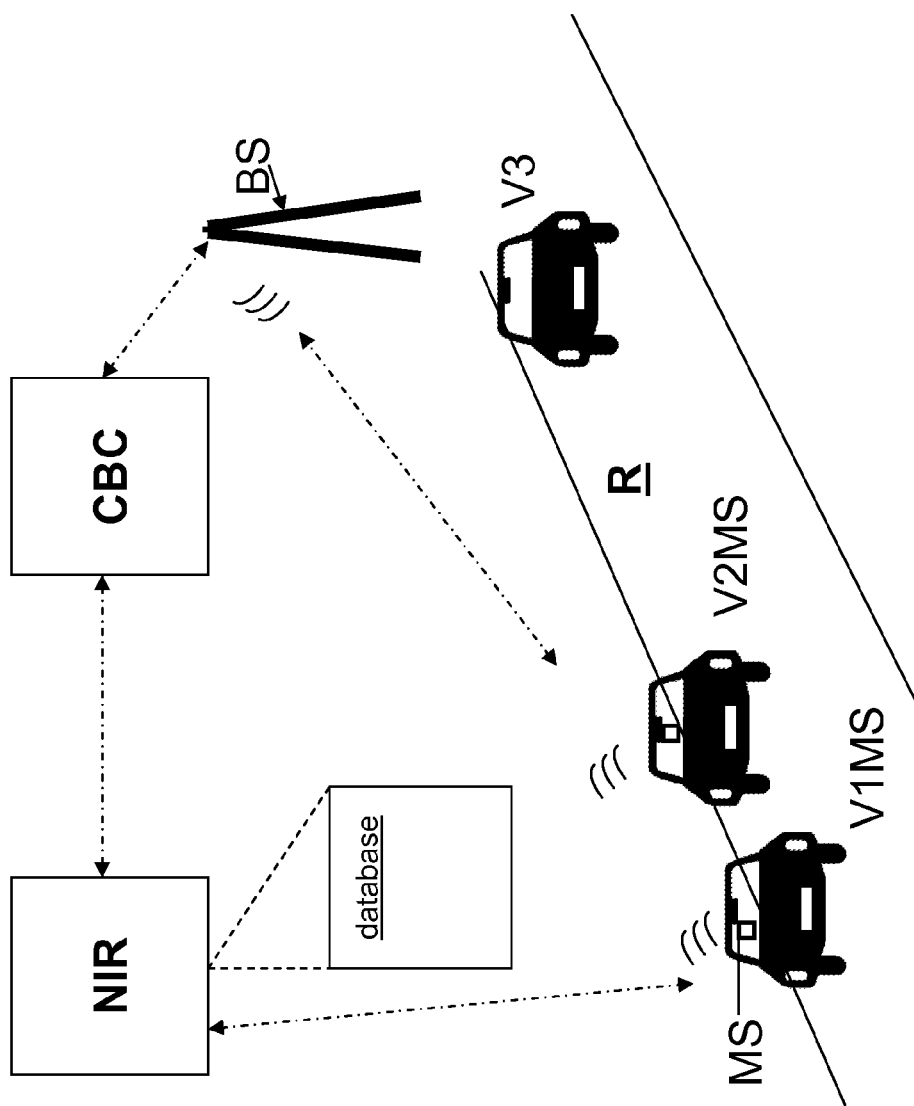
FIG. 8 is a schematic diagram illustrating a plurality of vehicles driving along a roadway, in communication with a NIR and with CBC broadcasts according to some illustrative embodiments.

Illustrative Applications:

Road Congestion and Other Road Information:

In some illustrative embodiments, a road congestion information application can be employed which informs users, on a real time basis, about the section on a road or highway that is facing congestion at any particular time. With reference to FIG. 8, in some illustrative embodiments a plurality of vehicles V1MS and V2MS on a roadway R can be equipped with mobile stations MS adapted to provide certain road congestion information to an NIR as described below.

In some illustrative and non-limiting embodiments, in order to embody this application, an MS is preferably made capable of obtaining its vehicle speed. By way of example, this could be accomplished by getting vehicle speed from the odometer, speedometer or the like of the vehicle, on Bluetooth or any short range WLAN. As another example, a global positioning system within the vehicle could be used to provide a calculation of the vehicle speed of the vehicle.

In some preferred embodiments, the MSs within the vehicles are also capable of receiving a specified speed limit related to the roadway the vehicle is traveling on. By way of example, this could be obtained by being broadcasted from the local base station. Alternately, this could be obtained by use of a previously downloaded map database including map and vehicle speed information, which, in conjunction with a geographic positioning system can be used to discern appropriate or legally specified speed limits. In some of the preferred embodiments, the MS compares its own speed (e.g., its determined actual speed) and the specified (e.g., broadcasted) speed limit, and, preferably, if there is a significant difference (i.e., inconsistency), the MS sends a message to the NIR to report the same. While in some embodiments, the MS of the vehicle could merely continually report its vehicle speed, limiting such reporting to situations involving actual inconsistencies is very advantageous in terms of limiting superfluous transmissions, etc.

Figure 9:
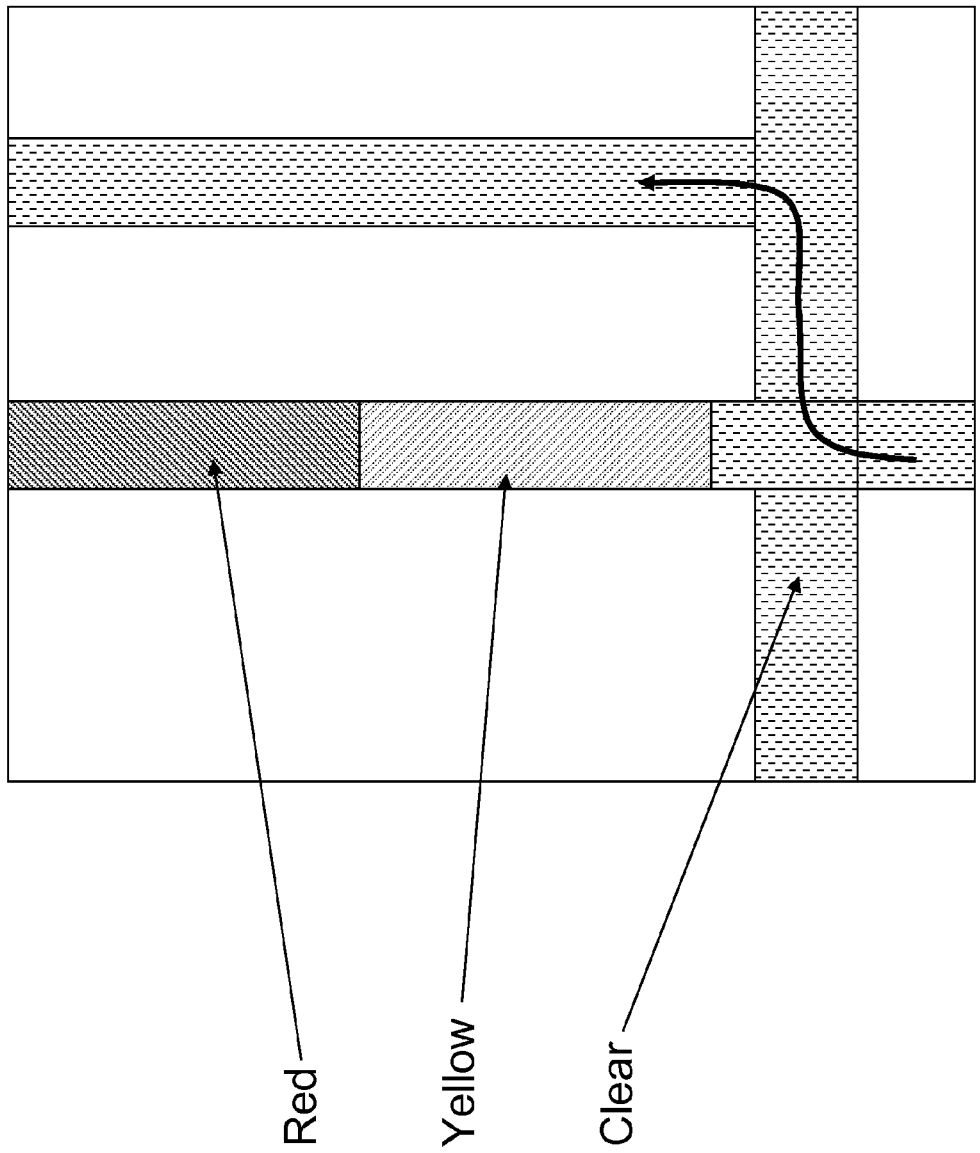
FIG. 9 is a schematic diagram of an illustrative display of a vehicle geographical positioning system according to some illustrative embodiments.

In the preferred embodiments, the NIR will receive such messages from a plurality of MSs from a congested segment of the road or highway. In some preferred embodiments, the NIR can translate the intensity of the congestion for display within a car or vehicle, such as, e.g., using color codes (such as, e.g., red, yellow, etc.) on a car's navigation device. By way of example, an illustrative map is depicted in FIG. 9. In this illustrative example, a vehicle can include a monitor (such as, e.g., a monitor of the vehicle's geographic positioning system and/or a monitor associated even with a MS of the type implemented within the vehicles V1MS and V2MS), which monitor can display a map image as with common geographic positioning systems. In the illustrated example, the roadway marked "clear" is free from traffic or congestion (e.g., in the preferred embodiments, there have been little or no reports from vehicle MSs of congestion). On the other hand, the region marked "yellow" relates to an area of increased congestion (e.g., in the preferred embodiments, there would have been a certain threshold decrease in vehicle speed resulting from increased congestion). And, yet, on another hand, the region marked "red" relates to an area of even greater congestion (e.g., in the preferred embodiments, there would have been a certain more substantial threshold decrease in vehicle speed resulting from greater congestion). While the illustrative example uses color to graphically represent traffic conditions, and while the illustrative example uses only three states of traffic (clear [white], medium [yellow], and high [red]), it is contemplated that a variety of other visual representations can be provided to facilitate viewing of traffic conditions, and that a variety of other levels (i.e., numbers of states can be chosen to more completely represent traffic pattern variations).

In various embodiments, this information can be sent though any air or wireless interface to the subscribed users.

In some embodiments, information about Department of Transportation specified speed limits can be provided with the specified speed limits mapped to roadways, such as, e.g., highway number and location (in some embodiments, this information can even take into account construction zones, speed limits, and/or certain temporary and/or unusual road conditions, etc., that can be documented and/or tracked) to the local NIR directly and/or to the CBC of a cellular system. Thus, in this manner, in some embodiments, the base station, e.g., can be adapted so as to broadcast the specified speed limits specified in a particular local area.

While the system can be used to enable reporting of road congestion, the system can be adapted so as to enable reporting of virtually any roadway condition. By way of example, one or more of the following events can be reported by vehicles using vehicle-mounted MSs in some of the preferred embodiments:

1. Road Congestion (see discussion above).
2. Vehicle Speeding.
   Here, a vehicle MS can be adapted to transmit a report related to the speeding of that vehicle itself (i.e., such that one's own vehicle reports its own speeding) and/or of other vehicles (i.e., such that one's own vehicle identifies and reports speeding of other nearby vehicles).
3. Accident Detection.
   Here, a vehicle MS can be adapted to transmit a report related to an accident related to that vehicle itself (i.e., such that one's own vehicle reports its own accident) and/or of other vehicles (i.e., such that one's own vehicle identifies and reports accidents of other nearby vehicles).
4. Unsafe or Reckless Driving.
   Here, a vehicle MS can be adapted to transmit a report related to the driving performance related to that vehicle itself (i.e., such that one's own vehicle reports its own driving) and/or of other vehicles (i.e., such that one's own vehicle identifies and reports driving of other nearby vehicles). In some embodiments, reckless driving can include motion sensors, torque sensors or other dynamic vehicle condition sensors on the vehicle (including speed sensors to identify, e.g., excessive speeds). In some embodiments, specified dynamic vehicle conditions can be compared in a manner similar to conducting a straight forward comparison of speed under item 1 above (Road Congestion). However, here, a focus would more likely be on an increased speed, verses a decreased speed that demonstrates congestion. By way of example, in the event that a dangerous driver (e.g., exhibiting a high rate of speed, a varied driving pattern or the like) is driving into a vicinity of a vehicle utilizing a system (e.g., subscribing thereto) according to these embodiments, then the system could, e.g., provide a warning, either audibly or visually related to that other vehicle or vehicle's presence (such as, e.g., providing an alarm and showing the vehicle's location in red on the monitor of another vehicle subscribing to the system).

5. Unsafe Road Conditions.

Here, a vehicle MS can be adapted to transmit a report related to the driving conditions faced by the vehicle as compared to normal driving conditions (i.e., such that unsafe driving conditions can be identified). Here, by way of example, a vehicle's anti-slip breaking system can be monitored and/or other vehicle conditions can be monitored so as to identify, e.g., slippery road conditions caused by rain, snow and/or oil. For example, if a vehicle's wheels unexpectedly slide, a message can be transmitted to the NIR. And, in the event that a plurality of vehicles experience such a condition, the hazard can be displayed or otherwise presented to the user of the mobile station. Even in circumstances where roadway conditions are normal in terms of weather or the like (i.e., free from snow, oil, or rain, etc.), this technique could be used to identify areas of roadway that are generally less safe, such as, e.g., where many cars need to brake abruptly. By monitoring such noted inconsistencies sensed by the vehicles, hazards can be foreseen well in advance, so as to increase safety.

In some of the preferred embodiments, primary information related to the vehicle monitoring services provided, including, e.g., vehicle speed limits in some embodiments, can be broadcast via a cellular network to the mobile stations. In some of the preferred embodiments, rather than continuously sending wireless transmissions, wasting power and energy and sending superfluous communications, the vehicle MS is adapted to transmit a report to the NIR in the event that inconsistencies are found, such as, e.g., based on an inconsistency comparison.

In the preferred embodiments, the NIR can process information to be reported by to users of mobile stations in a plurality of ways. First, in some embodiments, similar to embodiments described above, the NIR can process and send information to the cellular network (e.g., to the CBC), from with it can be broadcasted. In some embodiments, this broadcasting can be a free service (such as, e.g., a government authorized advisory service). However, in some embodiments, this can be a free service (e.g., such as, e.g., in which users are required to pay for services); here, a multicast can almost be used from a cellular network. Second, in some other embodiments, the NIR may send information via a cellular interface or wirelessly to those that pay for it—e.g., such as, e.g., using SMS or another messaging service.

In some embodiments, a plurality of NIRs can operate together to gather information to send to a mobile station, while in other embodiments, each NIR can merely communicate to a respective vehicle.

As would be appreciated by those in the art based on this disclosure, in some illustrative embodiments, an NIR can preferably cover a relatively large area, such as, e.g., in some embodiments more than a few square miles, or, in some other embodiments, more than about ten square miles, or in some other embodiments, more than about twenty square miles, or in some other embodiments more than about thirty square miles. On the other hand, an illustrative cell region of a base station in a cellular network can cover, e.g., a significantly smaller area than the area covered by the NIR, such as, e.g., a few miles or so in some examples. On the other hand, a respective CBC should likely cover a very large area that is also substantially larger than the cells. For reference, see, e.g., the illustrative example shown in FIG. 1.

In some embodiments, communications to the NIR, can be from substantially anywhere, such as, e.g., SMS addressed to the NIR or the like. On the other hand, the NIR can similarly send communications anywhere too.

Figure 10:
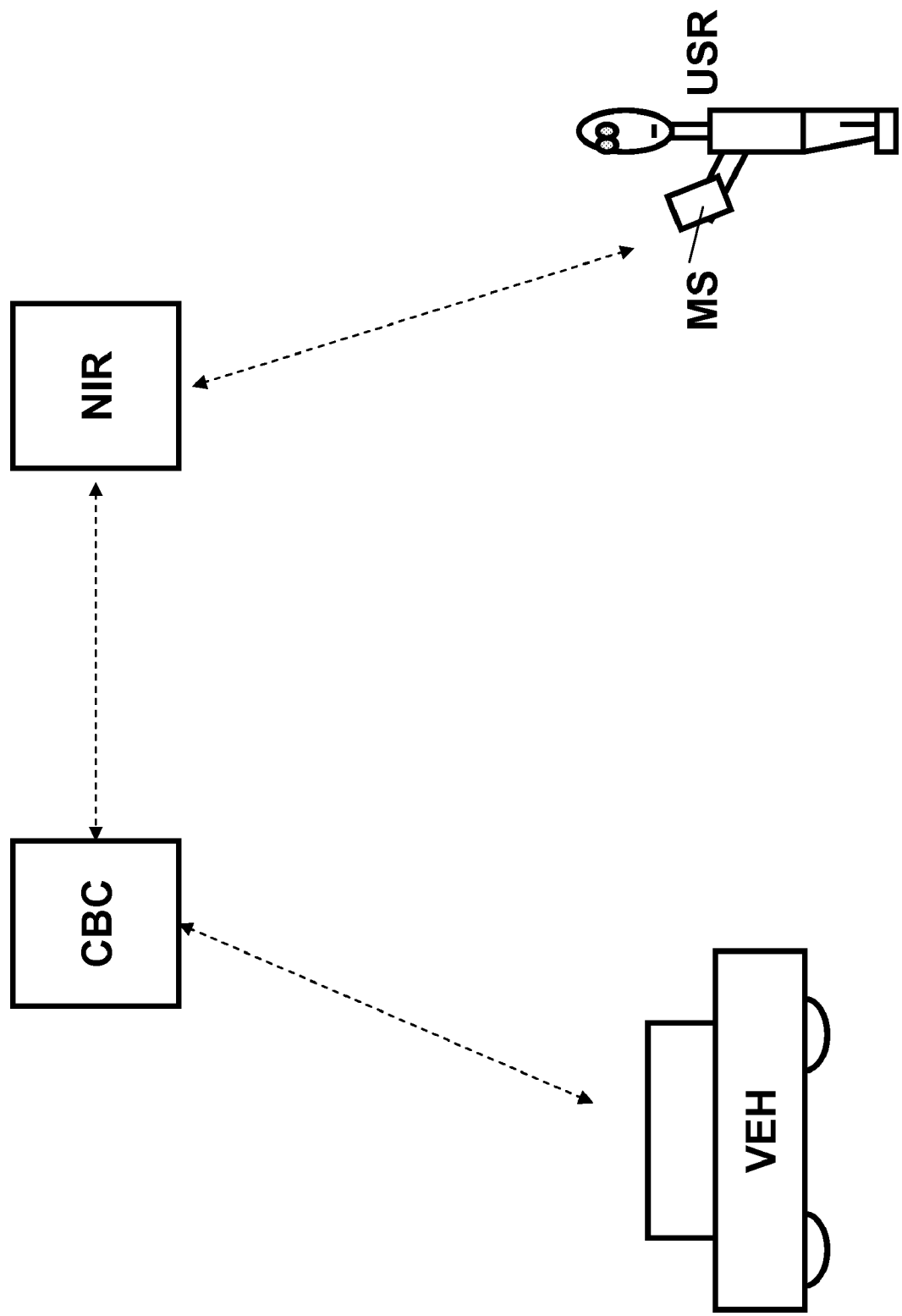
FIG. 10 is a schematic diagram of a cab dispatching scheme according to some of the preferred embodiments of the invention.

Electronic Cab Dispatching:

In some illustrative embodiments, a cab or other vehicle dispatching application can be provided that eliminates the need for Cab Dispatching Agencies. In some embodiments, a user needing a taxi can be, e.g., located or standing at a certain location, such as, e.g., depicted by user USR shown in FIG. 10. In some preferred embodiments, his mobile device MS knows the NIR address (e.g., which he may have received, e.g., from a cell broadcast as described in embodiments above). In some embodiments, the user presses a taxi icon on the user's MS or otherwise uses the MS to send a message to the NIR with the user's present location coordinates. In the preferred embodiments, the NIR can then search for a qualifying taxi VEH in its database. Upon finding a qualifying taxi VEH, the NIR can send a message to the taxi operator, such as, e.g., an SMS on the driver's cell phone or the like (e.g., through a CBC). For reference, SMS (Short Message Service) is a service for sending messages of up to, e.g., 160 or 224 characters to mobile phones that use Global System for Mobile (GSM) communication. Typically, SMS messages are transmitted within the same cell or to anyone with roaming service capability. In addition, SMS messages can also be sent to digital phones from a Web site application equipped with, e.g., PC Link. In some preferred embodiments, a qualifying cab to pick up the user USR is a cab in which:

1. In the preferred embodiments, whose cell phone number is registered in an established database (e.g., those cab's who have subscribed to the service) maintained on the NIR.
2. In the preferred embodiments, which is in the proximity of the geographical coordinates of the user.
3. In the preferred embodiments, whose flag is up (e.g., a vacant cab not currently serving any passenger). In this regard, in some embodiments, a cab can transmit a message identifying its status as vacant or not-vacant as would be understood by those in the art based on this disclosure.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A system for monitoring vehicle conditions, comprising:
   at least one network information repository server having at least one database containing information related to vehicle conditions;
   said at least one network information repository server being configured to receive updates from mobile stations that perform a comparison of vehicle conditions based on actual information sensed by the mobile stations as compared to expected vehicle conditions and that upon identifying an inconsistency send an update to the network information repository server; and
   the network information repository server being configured to transmit updated information to a cellular network for broadcasting or multicasting to mobile stations or to send information via a cellular interface or wirelessly to mobile stations.

2. The system of claim 1, wherein the network information repository server transmits information via a cellular interface or wirelessly to mobile stations.

3. The system of claim 2, wherein the network information repository server transmits information to mobile stations using SMS or another messaging service.

4. The system of claim 1, wherein the monitored vehicle conditions include road congestion, and said system is adapted to inform users, on a substantially real time basis, about sections on a road or highway facing congestion at a particular time.

5. The system of claim 1, wherein the system is configured to inform users on a real time basis about sections on a road or highway that is facing congestion at a particular time via the network information repository server.

6. The system of claim 1, wherein said network information repository server is configured to store information mapped with geographical location coordinates.

7. The system of claim 1, wherein said network information repository server is configured to store information mapped with time.

8. The system of claim 1, wherein the mobile station is configured to compare its own speed and a specified speed limit, and, if there is an inconsistency, the mobile station sends a message to the network information repository server to report the inconsistency.

9. The system of claim 1, wherein the network information server depicts an intensity of traffic congestion for display within a vehicle using visual representations on the vehicle's navigation device.

10. The system of claim 9, wherein said visual representations include color coding.

11. The system of claim 1, wherein the vehicle conditions involve road congestion, vehicle speeding, accident detection, unsafe or reckless driving, or unsafe road conditions.

12. The system of claim 1, wherein said system is configured as a system for electronic dispatching of a vehicle for hire, comprising:
   a) a said network information repository server adapted to receive a message from a user mobile station of a user's current location;
   b) the network information repository server being adapted to search a database for a qualifying vehicle for hire; and
   c) the network information repository server being adapted to, upon finding a qualifying vehicle for hire, send a message via a cellular network to the operator of the vehicle for hire.

13. The system according to claim 12, wherein qualifying vehicles for hire include at least one taxi cab.

14. The system according to claim 13, wherein said qualifying vehicles for hire include at least one taxi cab that: is registered in an established database maintained on the network information repository server; and is sufficiently in the proximity of the geographical coordinates of the user.

15. The system according to claim 14, wherein the at least one taxi cab transmits a message identifying its status as vacant or not-vacant.

16. The system according to claim 1, wherein said network information repository server transmits said updated information to a cellular network via a cell broadcast center.

17. The system according to claim 1, further including said network information repository server being configured to define a geographical area for the cellular network to which the information is to be broadcasted or multicasted to.

18. The system according to claim 1, further including said network information repository server being configured to communicate with a plurality of cellular systems belonging to different network operators.

19. The system according to claim 1, wherein the mobile station is equipped with multiple interfaces, including non-cellular and cellular interfaces.

20. The system according to claim 19, wherein said network information repository server is configured to transmit updated information to a cellular network for broadcasting or multicasting via a cell broadcast center to the mobile stations.

* * * * *

UNITED STATES PATENT AND TRADEMARK OFFICE
CERTIFICATE OF CORRECTION

PATENT NO. : 7,720,581 B2  
APPLICATION NO. : 11/456824  
DATED : May 18, 2010  
INVENTOR(S) : Yaqub Page 1 of 2

It is certified that error appears in the above-identified patent and that said Letters Patent is hereby corrected as shown below:

On the Title Page, in Item (73), under "Assignees", in Column 1, Lines 1-3, delete "Toshiba America Research, Inc., Piscataway; Telcordia Technologies, Inc., Piscataway" and insert -- Toshiba America Research, Inc., Piscataway, NJ (US); Telcordia Technologies, Inc., Piscataway, NJ (US) --, therefor.

In The Drawings

In Fig. 1, Sheet 1 of 10, delete "Figure-" and insert -- Fig. --, therefor.

Figure 2:
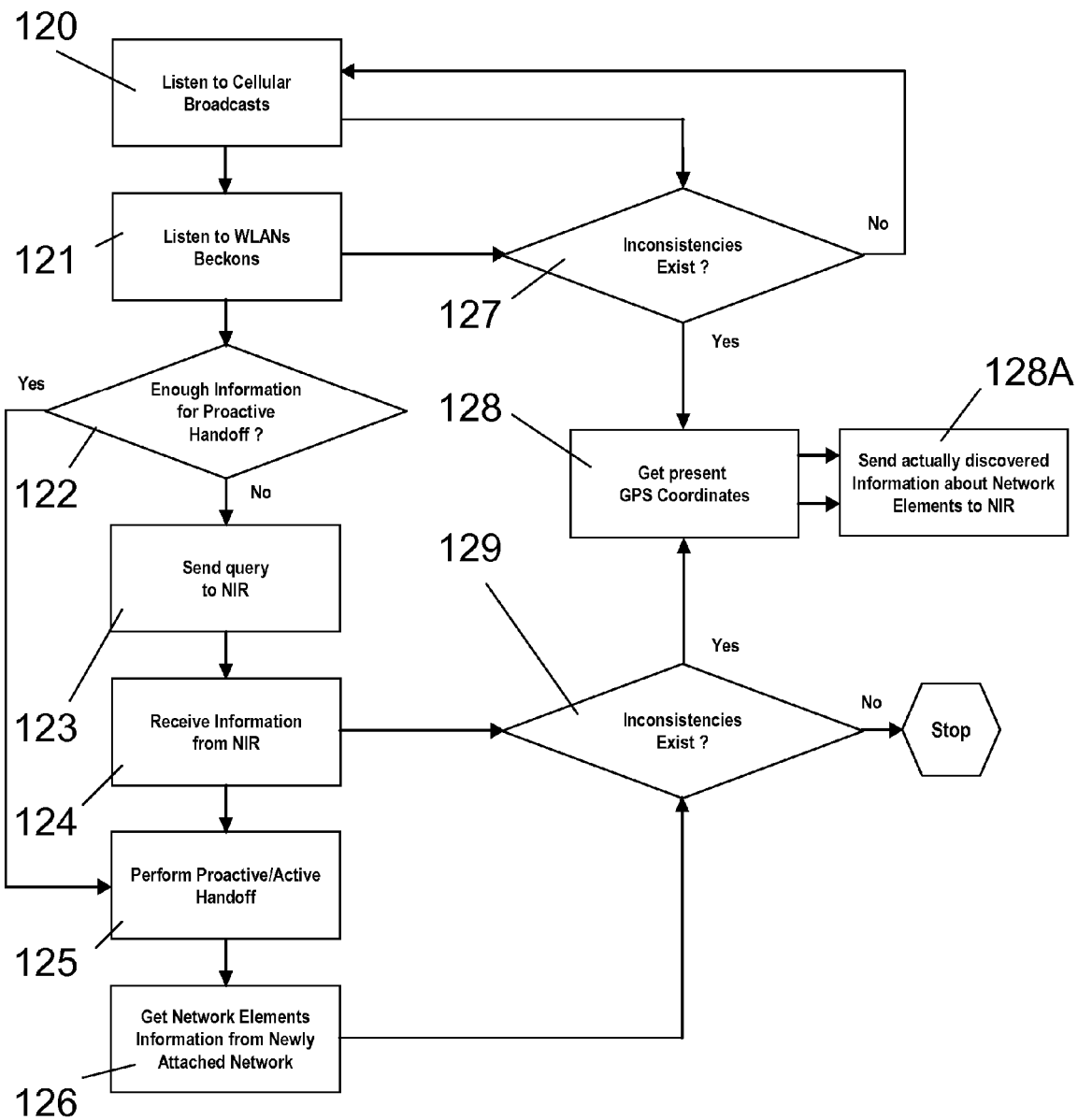
FIG. 2 is an illustrative flow diagram showing illustrative process steps performed by an MC in an active mode.

In Fig. 2, Sheet 2 of 10, delete "Figure" and insert -- Fig. --, therefor at each occurrence throughout the figures.

In The Specification

In Column 4, Line 29, delete "demands" and insert -- demands: --, therefor.

In Column 4, Line 64, delete "domain." and insert -- domain, --, therefor.

In Column 5, Line 32, delete "23.0411)." and insert -- 23.041/). --, therefor.

In Column 5, Line 38, delete "31.1021)." and insert -- 31.102/). --, therefor.

In Column 7, Line 52, delete "network 21," and insert -- network 20, --, therefor.

In Column 7, Line 56, delete "23, 25." and insert -- 23, 24. --, therefor.

In Column 10, Line 19, delete "to-." and insert -- to- --, therefor.

Signed and Sealed this  
Twentieth Day of January, 2015

Michelle K. Lee  
*Deputy Director of the United States Patent and Trademark Office*

CERTIFICATE OF CORRECTION (continued)
U.S. Pat. No. 7,720,581 B2

In The Claims

In Column 22, Line 24, in Claim 12, delete "a said" and insert -- said --, therefor.